3,361,689
POLYURETHANES BY REACTION OF 1,2-BIS(DI-FLUORAMINO) ETHYL ISOCYANATE WITH POLYVINYL ALCOHOL OR NITROCELLULOSE
Ralph E. Miegel, Wilmington, Del., and Edmond J. Nolan, Woodbury Heights, N.J., assignors to E. I. du Pont de Nemours and Company, Wilmington, Del., a corporation of Delaware
No Drawing. Filed Aug. 22, 1961, Ser. No. 135,404
1 Claim. (Cl. 260—13)

The present invention relates to new and improved polyurethanes containing two or more

—OCONHCH(NF$_2$)CH$_2$NF$_2$ radicals pendent from a polyvinyl alcohol or nitrocellulose backbone structure, said polyurethanes being in the form of small, dense, essentially spherical particles.

Polyurethanes prepared by the recation of 1,2-bis(difluoramino)ethyl isocyanate with polyvinyl alcohol or nitrocellulose and containing two or more

—OCONHCH(NF$_2$)CH$_2$NF$_2$ radicals pendent from a polyvinyl alcohol or nitrocellulose backbone structure are disclosed in co-pending application Ser. No. 83,837 filed Jan. 19, 1961, by R. A. Smiley and assigned to the present assignee. As disclosed therein, these polyurethanes can contain a high percentage by weight of —NF$_2$ groups and are highly desirable for use in rocket propellant formulations. In view of their polymeric nature, these materials are eminently suitable as high-energy binders for solid propellants.

Until the present time, however, the incorporation of the aforedescribed polyurethanes into propellant formulations has been hampered by the fibrous nature of the polyurethanes. As is known, in the preparation of cast propellant grains the polymeric binder material is dispersed in a plasticizing liquid to form a uniform fluid suspension which is thereafter poured into a mold. The plasticizing liquid is any liquid in which the polymeric binder material is insoluble or only slowly soluble at room temperature, but soluble at elevated temperature. The suspension in the mold is cured by heating whereupon the polymeric binder material dissolves in the plasticizing liquid and the mass in the mold becomes a solid homogeneous mass conforming to the shape of the mold. Obviously, when the polymeric binder is a high-energy material, it is desirable to disperse as large an amount of the polymer in the plasticizing liquid as possible in order that a propellant grain highly concentrated in the energetic material be produced.

As prepared by the procedure described in the aforementioned co-pending application, polyurethanes containing two or more —OCONHCH(NF$_2$)CH$_2$NF$_2$ radicals pendent from a polyvinyl alcohol or nitrocellulose backbone structure are fibrous materials, being comprised of relatively large and irregularly shaped porous particles. As a result of their porosity, the particles are low in density. Satisfactory cast propellant grains cannot be made from material of this kind since such material cannot be dispersed in a plasticizing liquid in adequate amounts without loss of fluidity. The porous particles absorb the plasticizing liquid rapidly to form a viscous dispersion which is not fluid enough to be poured. Because of the size and irregular shape of the particles, the dispersion is not uniform throughout. More importantly, the rapid absorption of the liquid and the resultant loss of fluidity prevent the dispersing of the polymer in as high concentrations as may be desired.

We have now found that polyurethanes containing two or more —OCONHCH(NF$_2$)CH$_2$NF$_2$ radicals pendent from a polyvinyl alcohol or nitrocellulose backbone structure can be obtained in the form of small, dense, essentially spherical particles, which can be readily dispersed in a plasticizing liquid to form a uniform, fluid suspension. The size of the spherical particles can vary from about 1 micron to about 250 microns. The dense, essentially spherical particles are essentially nonporous and as a result do not absorb large quantities of the plasticizing liquid rapidly; thus highly concentrated suspensions can be obtained.

The new and improved polyurethanes of the present invention are prepared by dissolving a fibrous polyurethane containing two or more —OCONHCH(NF$_2$)CH$_2$NF$_2$ radicals pendent from a polyvinyl alcohol or nitrocellulose backbone structure in an organic solvent, dispersing the polyurethane solution in water in the presence of a colloiding agent and/or an emulsifying agent under agitation whereby dispersed polyurethane particles are formed, and removing the organic solvent from the dispersed polyurethane particles. The particular size of the particles obtained and the density of the material is dependent to a large extent upon the chosen process conditions, e.g., the amount of water used in relation to the amount of organic solution, the degree of agitation, and the concentration of the colloiding agent and/or emulsifying agent. The effect of these conditions on the product properties will be explained more fully hereinafter.

The organic solvent for the polyurethane can be any solvent which dissolves the polymer, and may consist of a single component or a mixture of components. Typical solvents which can be used are esters of formic acid and acetic acid, e.g., methyl, ethyl, isopropyl, and butyl formates and acetates; low-molecular-weight, e.g., 1–5 carbon, aliphatic ketones, e.g., acetone, and mixtures thereof with the above-mentioned formates or acetates; and mixtures of a low-molecular-weight, e.g., a 1–3 carbon, alkanol with the above-mentioned formates or acetates. The particular solvent system chosen in any particular case will depend on various factors, such as the chemical structure of the polyurethane, the size of the polymer molecule, the method of solvent removal which will be used, and the colloiding agent used, if any. If a colloiding agent is used, for example, the organic solvent system should be one in which the colloiding agent is not excessively soluble in order to assure the formation of an oil-in-water type emulsion.

The concentration of the organic solution of the polyurethane, while dependent to a certain extent on the particular polyurethane and solvent involved, can vary within wide limits. The lower concentration limit is dependent chiefly on economical considerations inasmuch as operation in regions of low concentration, while possible, nevertheless is uneconomical because of the large amount of solvent needed. The upper concentration limit is that concentration at which the solution becomes so viscous as to render difficult the dispersion thereof in water. Consequently, the upper concentration limit depends on the molecular weight of the polyurethane. Generally, a satisfactory concentration range is from about 5% to about 30% by weight of the polyurethane, and the preferred range is from about 10% to 25%.

The solution of the polyurethane in an organic solvent is dispersed with agitation in water in the presence of a colloiding agent and/or an emulsifying agent to form an oil-in-water type emulsion. It is believed that the colloiding and/or emulsifying agents stabilize the oil-in-water emulsion so that the surface of the particles have an opportunity to harden into a substantially non-tacky condition before agglomeration can occur. The colloiding agent, which is added to the water prior to dispersing the organic solution therein, forms a colloidal solution with the water, thereby increasing the viscosity of the water phase, and also surrounds the oil particles with a protective coating. The emulsifying agent, which can be incorporated in the oragnic solution or dissolved in the water, functions chiefly as a surface-tension depressant and hastens the dispersion of the organic solution in the water. The colloiding agent is a high-molecular-weight material which is preferentially soluble in water rather than in the organic solvent. Therefore, the particular colloiding agent used depends largely on the organic solvent used. Typical colloiding agents which are suitable are cellulose ethers such as methylcellulose and sodium carboxymethylcellulose, carboxyvinyl polymer salts, and other water-soluble gums such as gum arabic. The amount of colloiding agent employed depends on several factors, such as the molecular weight of the colloid and whether or not an emulsifying agent is used. Enough colloiding agent should be used to increase the viscosity of the water phase and to coat the particles formed. The higher the molecular weight of the colloid, the less colloid will be required. The greater the amount of colloid used, the smaller the particle size tends to become. Therefore, while there is no upper limit on the amount of colloiding agent used, in practice an upper limit may be imposed on this material in deference to a desired particle size or to avoiding the need for excessive washing to subsequently remove the colloid. In general, the amount of colloiding agent used will be about 1–25% by weight of the polyurethane.

In place of the colloiding agent, or in addition to it, one or more polar-type emulsifying agents can be used to stabilize the oil-in-water emulsion. Any suitable surface-active emulsifying agent may be used which is compatible with the other components of the system and which is substantially soluble in water, i.e., possesses a sufficiently high hydrophile-lipophile balance to prevent its being drawn into the organic solvent and converting the emulsion into a water-in-oil system. Examples of suitable emulsifiers include alkyl sulfates or sulfonates, alkyl aryl sulfonates, alkali metal soaps, alkali metal salts of perfluoro acids, alkali metal salts of sulfosuccinic acids and esters thereof, polyglycols such as polyethylene glycol and polypropylene glycol, modified polyglycols such as the polyoxyalkylene derivative of sorbitan monolaurate, and sulfonated oils including sulfonated vegetable oils and sulfonated hydrocarbon oils.

The amount of surface-active emulsifying agent(s) used depends on such factors as whether or not a colloiding agent is used, how much colloiding agent is used, the activity of the specific emulsifying agent(s) used, and the particular solvent used to dissolve the polyurethane. However, the emulsifying agent(s) should be present in an amount sufficient to promote rapid emulsification and comminution of the particles. Generally, at least about 0.01% based on the water phase will be used, although even lesser amounts may be satisfactory when a colloiding agent also is present. Although there is no upper limit on the amount of emulsifying agent used, generally there is no advantage to using more than about 5 to 10% based on the water phase.

Whether a colloiding agent, an emulsifying agent, or a mixture of both is used in the preparation of the polyurethanes of the present invention is dependent chiefly on economic factors. While it is desirable to have the presence of the colloiding agent to reduce the tendency of the particles to coalesce, particularly during stripping of the solvent, the use of the colloiding agent entails greater expense than does the use of the noncolloiding emulsifying agent because of the washings required to remove the coating of protective colloid from the particles. While the use of only the emulsifying agent(s) is satisfactory, in practice the most favorable results may be obtained when both types of additives are used; in such a case, the removal of the colloiding agent from the particles presents no severe problem since the use of the emulsifying agent(s) reduces the amount of colloiding agent which is used.

The amount of water used in forming the oil-in-water type emulsion is dependent to a certain extent on the amount of organic solvent(s) used and on the desired particle size, inasmuch as increasing the amount of water has the effect of increasing the particle size. The minimum amount of water which can be used is that amount which is sufficient to give an oil/water ratio such that the emulsion formed will be of the oil-in-water type rather than the water-in-oil type. The maximum amount of water is that amount in excess of which the particles which form are oversized. In general, an amount of water ranging from about 50 to 125% by volume, based on the volume of organic solvent(s) present, is satisfactory.

The particle size is also affected by the degree of agitation applied during emulsification, more vigorous agitation leading to smaller particles. Thus, the speed of agitation used will be determined to some extent by the desired particle size.

After emulsification is completed, the organic solvent is removed from the polyurethane particles by distillation, elution, air stripping or equivalent methods. Elution of the solvent can be accomplished by diluting the emulsion with water in an amount which will completely dissolve the organic solvent out of the polyurethane particles. The particular amount of water used will depend on the solubility in water of the organic solvent used, and will be in excess of that theoretically required to dissolve the solvent. A particularly effective method of removing the organic solvent from the particles is to pass air under reduced pressure over the surface of the agitated liquid thereby to entrain solvent vapors. When the solvent has been removed, the polyurethane particles are separated from the water, washed with water, and dried. If no colloiding agent has been used, one washing usually is sufficient. On the other hand, if a colloiding agent is present, several washings may be required, the particular number needed in any particular case being dependent on the amount of colloiding agent which has been used and on the particle size, smaller particles generally requiring more washings.

The polyurethanes of the present invention can be prepared from polymeric alcohols of varying degrees of polymerization. Although the degree of polymerization of the fibrous polyurethane will have an effect on such variables as the amount of organic solvent used, the molecular weight of the polyurethane has no effect on whether or not small, dense, spherical particles can be obtained. For example, the improved polyurethanes of the present invention can be obtained from fibrous material prepared from polyvinyl alcohol having degrees of polymerization ranging from 50 to 25,000, and from nitrocellulose having viscosities ranging from 0.5 second to 40–60 seconds.

The following examples serve to illustrate specific embodiments of the method of preparing the new and improved polyurethanes of the present invention. However, the examples will be understood to be illustrative only and not as limiting the invention in any manner.

*Example 1*

A polyurethane containing

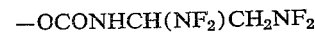

groups pendent from a polyvinyl alcohol backbone structure in units as follows:

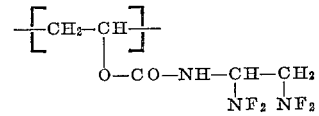

was prepared according to the following procedure:

Twenty-two grams of polyvinyl alcohol (molecular weight: about $11 \times 10^5$) was added to 450 milliliters of N-methylpyrrolidone, and the resulting slurry was heated to 90° C. to dissolve the polymer. After cooling and the addition of 0.4 milliliter of acetic acid to the solution, 120 grams of a 95/5 mixture of 1,2-bis(difluoramino)-ethyl isocyanate and cyclohexanone was added to the stirred solution at 27–34° C. over a period of 1 hour. The mixture was stirred for 2.75 hours after completion of the addition of isocyanate, and then was poured into water and mixed. The precipitate which formed was filtered off, washed twice with water, and dried (110 grams obtained). The polyurethane (designated 1A) was fibrous in nature, microscopic examination revealing irregularly shaped porous particles; the latter were up to several millimeters in length. The fibrous material could be packed to a bulk density of only 0.08 gram per 100 milliliters.

Twenty grams of the fibrous polyurethane was dissolved in 100 milliliters of methyl acetate, and the solution was added slowly to a vigorously agitated solution prepared by mixing (1) 100 milliliters of a solution of 9.6 grams of methylcellulose (4000 centipoises) in 1 liter of water, (2) 80 milliliters of a solution of 2 grams of dioctyl sodium sulfosuccinate and 2 grams of a polyoxyalkylene derivative of sorbitan monolaurate in 500 milliliters of water, and (3) 440 milliliters of water. Vigorous agitation of the mixture was continued for 10 minutes after all of the polyurethane solution had been added. The mixture then was permitted to stand for 10 minutes, and was subsequently diluted with 800 milliliters of distilled water. The diluted mixture was allowed to stand for 1 hour, after which time the supernatant liquid was decanted. The dense solid was swirled with water, filtered, and the residue washed repeatedly with water (total volume of wash water: about 800 milliliters). The polyurethane (designated 1B), after filtering and drying, weighed 15.8 grams, and had a bulk density of 0.8 gram per 100 milliliters (i.e., 10 times that of the fibrous material.) Particle density was 1.58. The product had a particle size distribution of $10\mu$ to $96\mu$. Fifty percent by weight of the product was less than $58\mu$ in size. The spherical and nonporous nature of the particles was revealed by microscopic examination.

*Example 2*

A polyurethane containing

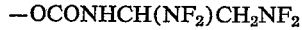
—OCONHCH(NF$_2$)CH$_2$NF$_2$ groups pendent from a nitrocellulose backbone structure in units as follows:

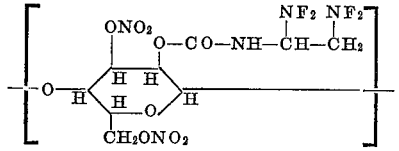

was prepared according to the following procedure:

Seventy-five grams of nitrocellulose (having a 10.9–11.2% nitrogen content and a viscosity of 40–60 seconds) was dissolved in 1400 milliliters of acetone. To this solution were added 105 grams of a 95/5 mixture of 1,2-bis(difluoramino)ethylisocyanate and cyclohexanone, and 0.1 gram of dimethyltin dichloride. The mixture was refluxed for 1.5 hours and the product worked up in the same manner as the product designated 1A in Example 1 (118 grams obtained). The polyurethane (designated 2A) was fibrous in nature, microscopic examination revealing irregularly shaped porous particles; the latter were about several millimeters in length. The fibrous material could be packed to a bulk density of only 0.076 gram per 100 milliliters.

The fibrous polyurethane (50.7 grams) was dissolved in 400 milliliters of methyl acetate, and the solution was added in a thin stream to a vigorously agitated solution comprised of: (1) 250 milliliters of a solution of 9.6 grams of methylcellulose (4000 centipoises) in 1 liter of water, (2) 100 milliliters of a solution of 2 grams of dioctyl sodium sulfosuccinate and 2 grams of a polyoxyalkylene derivative of sorbitan monolaurate in 500 milliliters of water, and (3) 100 milliliters of water. After completion of the addition, the mixture was stirred vigorously for 15 minutes. Then, while the mixture was stirred for one hour, air was drawn through the flask to remove solvent vapors. A creamy emulsion resulted. The product was diluted to 3 liters with water, allowed to settle, collected on a filter, washed repeatedly with water, and dried. The polyurethane (designated 2B) had a bulk density of 0.704 gram per 100 milliliters, a particle density of 1.6, and a particle size distribution of $10\mu$ to $70\mu$ (50% of the particles less than $52\mu$). The spherical and nonporous nature of the particles was revealed by microscopic examination.

*Example 3*

The procedure of Example 2 was repeated with the exception that the methylcellulose colloiding agent was omitted. Ten grams of the fibrous polyurethane was dissolved in 200 milliliters of methyl acetate. The aqueous solution to which the organic solution was added was comprised of (1) 100 milliliters of a solution of 2 grams of dioctyl sodium sulfosuccinate and 2 grams of a polyoxyalkylene derivative of sorbitan monolaurate in 500 milliliters of water, and (2) 200 milliliters of water. Microscopic examination of the product showed well-formed spheres. The particle size distribution of the material was from $55\mu$ to $236\mu$, 75% of the particles being less than $131\mu$ and 40% less than $105\mu$.

The particulate structure of the improved polyurethanes of the present invention is such that the particles can be suspended in satisfactory amounts in a plasticizing liquid to form uniform, fluid slurries which can be poured into molds for producing cast propellant grains. The results obtained when attempts were made to disperse the improved polyurethanes of the present invention as well as fibrous polyurethanes in a plasticizing liquid, i.e., triethylene glycol dinitrate, are given in the following table. The polyurethanes are referred to by the designation given them in the foregoing examples. The ratio of polyurethane to plasticizing liquid was 3/7 in the case of polyurethanes 1A and 1B, and 5/7 in the case of polyurethanes 2A and 2B.

| Polyurethane | Physical Properties | Dispersibility |
| --- | --- | --- |
| 1B | Bulk d.=0.8 g./100 ml. (nonporous), spherical, 10–96$\mu$. | Easily dispersed in triethylene glycol dinitrate; smooth, fluid dispersion; pourable. |
| 1A | Bulk d.=0.08 g./100 ml. (porous), elongated, several mm. long. | Rapidly formed very viscous mass in triethylene glycol dinitrate; difficult to stir; not pourable. |
| 2B | Bulk d.=0.704 g./100 ml. (nonporous), spherical, 10–70 $\mu$. | Easily dispersed in triethylene glycol dinitrate; smooth, fluid, dispersion; pourable. |
| 2A | Bulk d.=0.076 g./100 ml. (porous), elongated, several mm. long. | Rapidly formed very viscous mass in triethylene glycol dinitrate; difficult to stir; not pourable. |

The invention has been described in detail in the foregoing. It will be apparent to those skilled in the art that many variations are possible without departure from the scope of the invention. Therefore, we intend to be limited only by the following claim.

We claim:

1. A process for preparing substantially spherical particles of polyurethanes containing at least two —OCONHCH(NF$_2$)CH$_2$NF$_2$ radicals pendent from the polymer backbone structure of a polymeric alcohol selected from the group consisting of nitrocellulose and polyvinyl alcohol which comprises dissolving fibrous polyurethane having the aforesaid chemical composition in an inert organic solvent, dispersing the polyurethane solution in water in the presence of a surface-modifying material selected from the group consisting of inert colloiding agents, inert emulsifying agents, and mixtures thereof under agitation whereby dispersed polyurethane particles are formed, and removing said organic solvent from said particles.

No references cited.

DONALD CZAJA, *Primary Examiner.*

L. D. ROSDOL, R. L. CAMPBELL, *Examiners.*

J. W. WHISLER, F. E. McKELVEY,
*Assistant Examiners.*